Dec. 24, 1946.  J. M. BRIAN  2,413,211
REMOTE CONTROL FREQUENCY SELECTOR SYSTEM
Filed Oct. 28, 1944  5 Sheets-Sheet 2
FIG: 2
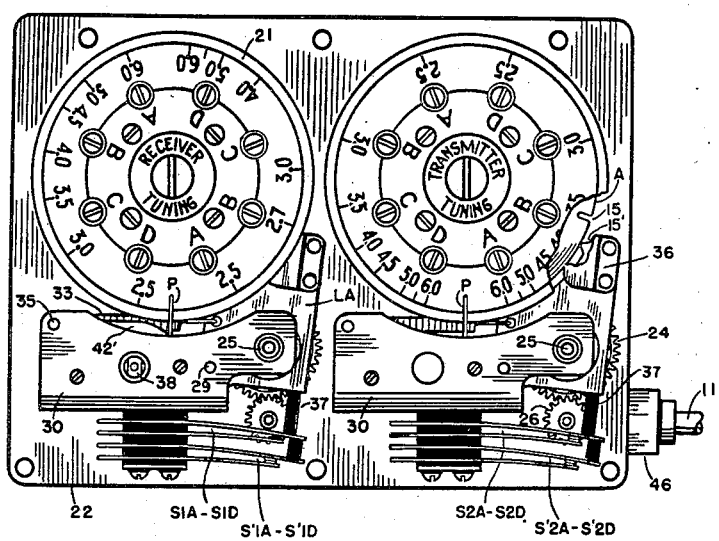
FIG: 3
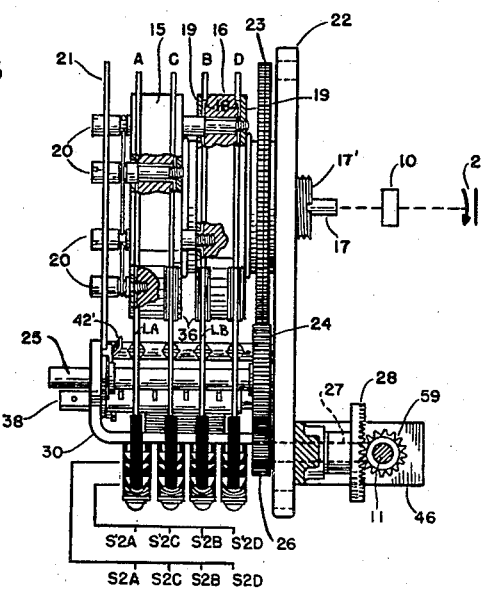
INVENTOR.
JOSEPH M. BRIAN
BY
ATTORNEY

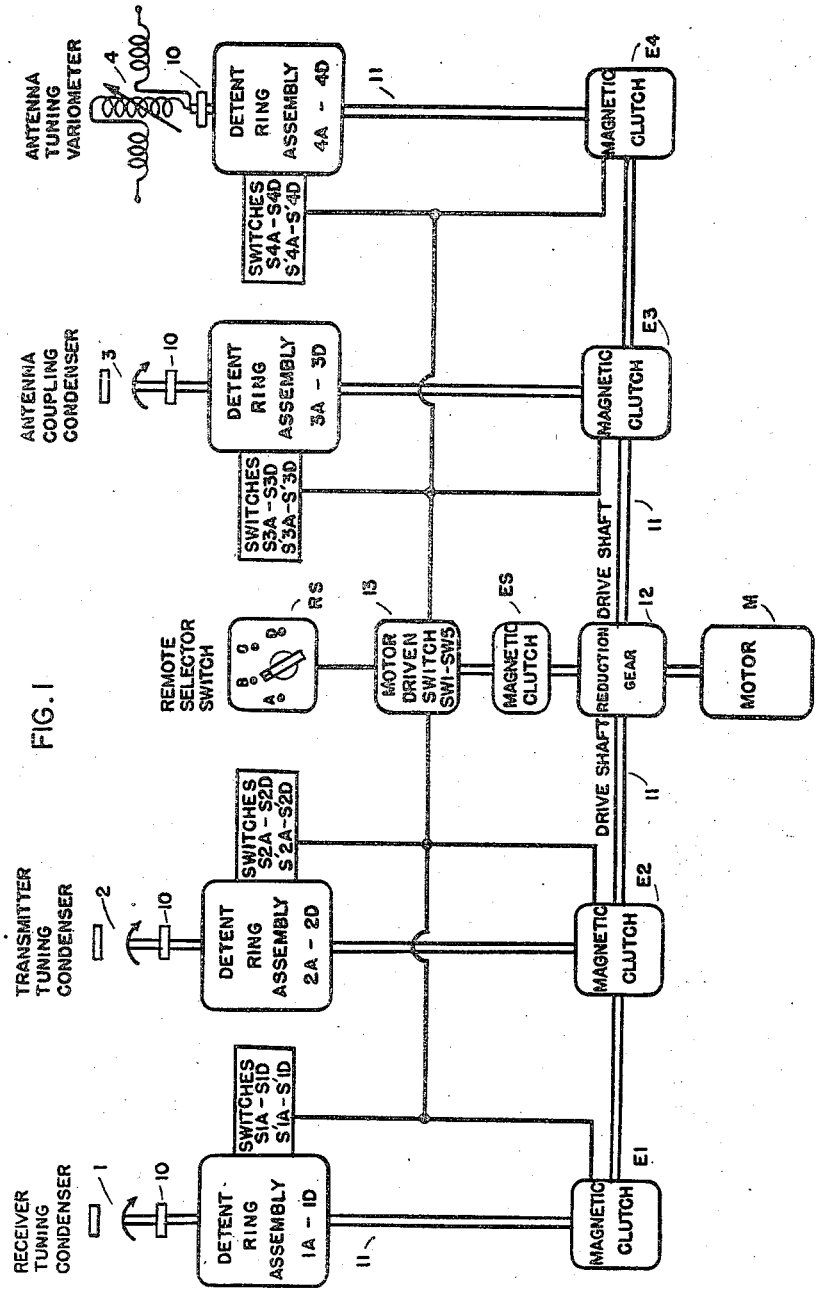

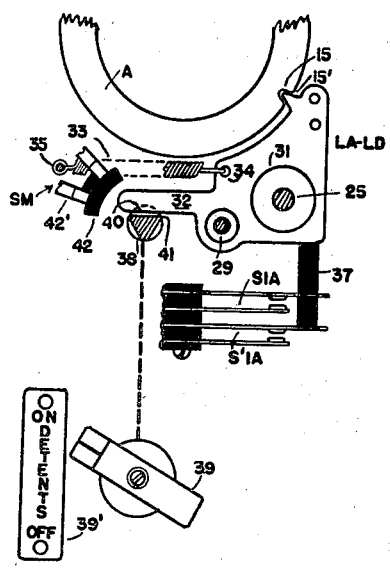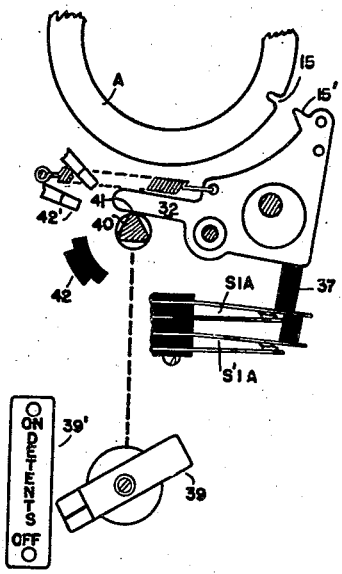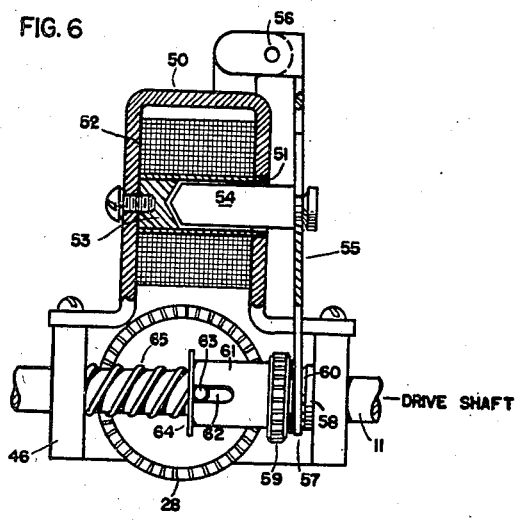

Dec. 24, 1946.  J. M. BRIAN  2,413,211
REMOTE CONTROL FREQUENCY SELECTOR SYSTEM
Filed Oct. 28, 1944  5 Sheets-Sheet 4
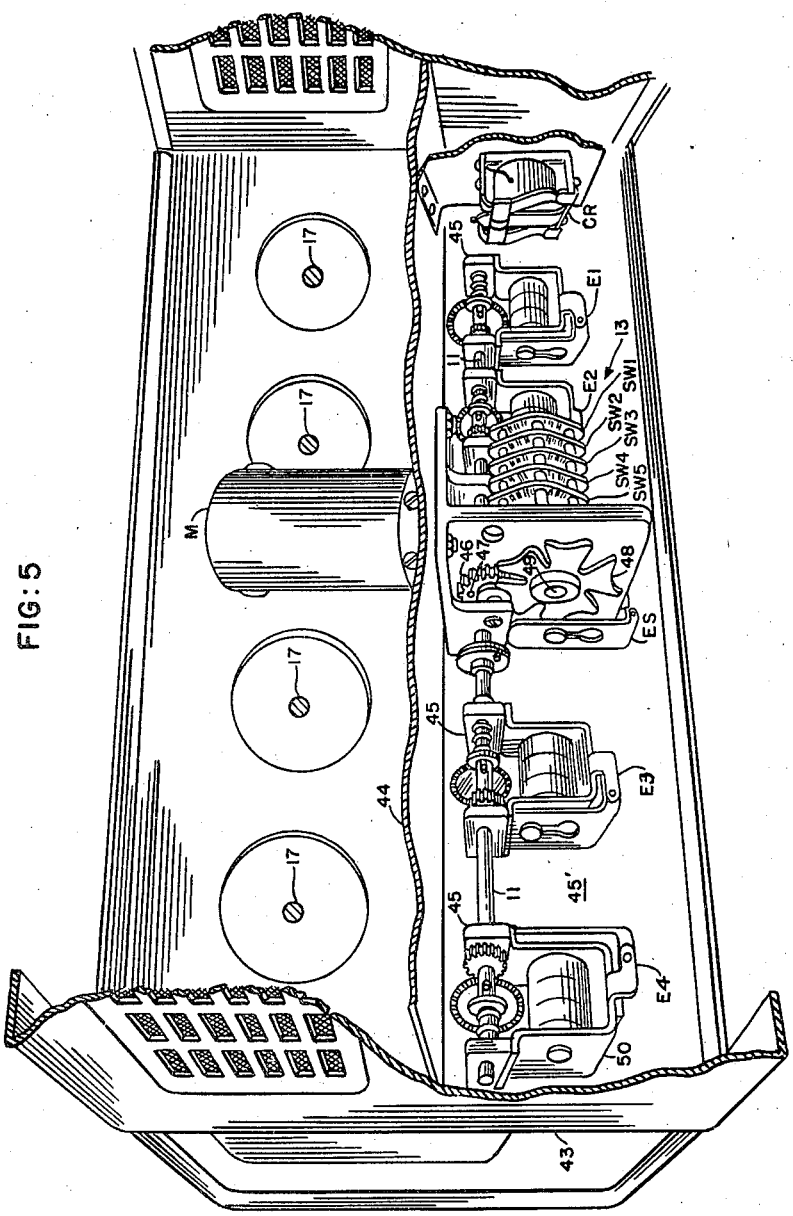
INVENTOR.
JOSEPH M. BRIAN
BY
ATTORNEY

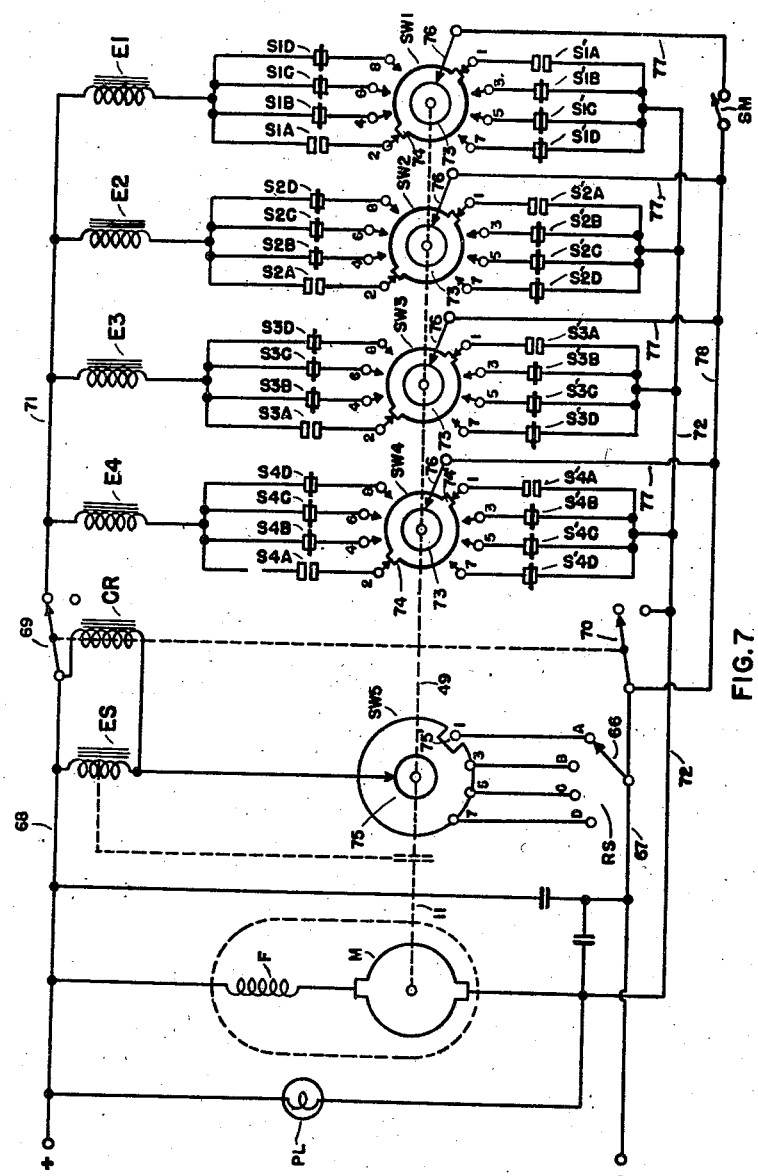

Patented Dec. 24, 1946

2,413,211

UNITED STATES PATENT OFFICE 2,413,211

REMOTE CONTROL FREQUENCY SELECTOR SYSTEM

Joseph M. Brian, Westmount, Quebec, Canada, assignor, by mesne assignments, to Radio Corporation of America, New York, N. Y., a corporation of Delaware Application October 28, 1944, Serial No. 560,819
In Canada June 2, 1944

16 Claims. (Cl. 192—142)

The present invention relates to a selector system for automatically adjusting a plurality of variable elements of radio apparatus to predetermined frequency settings from a remote control point.

One of the objects of the invention is to provide variable element positioning means of simplified form employing a single unidirectional motor, a selector switch for initiating operation of the motor, and mechanical stop means movable with the variable element and effective when the latter is actuated to its predetermined position to cause the motor to be deenergized.

Another object of the invention is to provide each variable element with a detent ring assembly which constitutes mechanical stop or positioning means, the several rings corresponding each to a different frequency channel and being capable of individual adjustment in a relatively simple manner to any desired pre-set angular position.

Another object of the invention is to provide relatively simple means whereby at least one of the variable elements may be disassociated from the automatic selector mechanism to enable manual adjustment of said variable element to any desired frequency setting.

A more specific object is to provide automatic mechanism for a plurality of frequency determining devices, each adapted for selective adjustment to one of a plurality of predetermined positions which correspond to different frequency channels, the mechanism comprising a plurality of detent ring assemblies each of which is mechanically coupled to one of the adjustable devices, each ring assembly consisting of a number of detent rings equal to the number of frequency channels, a pivoted detent arm adapted to cooperate with each detent ring, a selector switch operative to select the particular detent arm, one in each ring assembly, that is to be effective in determining the desired position of adjustment of each device, an electric motor and a shaft adapted to be driven thereby, magnetic clutches for individually coupling the selector switch and the several detent ring assemblies to the motor shaft, and normally-closed switch means under the control of the detent arms for independently coupling the selector switch and the several ring assemblies to the motor shaft upon actuation of a remote selector switch, said switch means being so constructed and arranged that as the detent ring assemblies are successively rotated into locking engagement with the detent arms that have been selected to control the operation of the mechanism, the several devices at that time having assumed their pre-set positions, the motor is caused to be deenergized.

And a still further object is to provide a frequency selector mechanism of the type mentioned which has a high degree of resetability, is simple to operate, of compact construction and light weight, such that it may be suitable for use in conjunction with aircraft radio equipment where there characteristics are especially important.

The novel features characteristic of my invention are set forth with particularity in the appended claims. The invention itself, however, as to both its organization and mode of operation together with further objects and advantages thereof, will best be understood by reference to the following description taken in connection with the accompanying drawings, in which:

Fig. 1 is a schematic block diagram of the frequency selector system of the present invention, showing the cooperative relation of the several component parts and will serve to explain the operation of the system;

Fig. 2 is a front elevational view of two of the tuning dials, part of one being broken away to show the detent ring assembly; the detent arms for each assembly; and their associated switches;

Fig. 3 is a side view of Fig. 2, partly in section;

Figs. 4A and 4B are views illustrating, respectively, the locked and unlocked positions of a detent ring of the assembly associated with the receiver tuning condenser;

Fig. 5 is a perspective view looking from the rear of the housing, showing the motor drive mechanism including a Geneva cam drive for the selector switch, and of the various magnetic clutches and the control relay;

Fig. 6 is a detailed view of the magnetic clutches shown in Fig. 5; and

Fig. 7 is a schematic wiring diagram of the selector system.

While it should be understood that the invention may be applied equally as well for the remote control of receivers or transmitters, it is shown for illustrative purposes only, to be applied to a receiver-transmitter designed for use in aircraft and adapted to operate on four frequency channels which for convenience will be designated A, B, C, and D. The tuning elements required to be adjusted in switching from one frequency channel to another are the receiver tuning condenser, the transmitter tuning condenser, the antenna coupling condenser and the antenna tuning variometer. These are indicated at 1, 2, 3 and 4 respectively, in Fig. 1 to which reference will now be made for a brief explanation of the operation of the system and the cooperative relation between the several component parts constituting the system.

The above variable elements 1 to 4 are connected each through suitable mechanical coupling means, shown diagrammatically at 10, to their respective detent ring assemblies, 1A—1D, 2A—2D, 3A—3D, and 4A—4D. Through suitable gearing, later to be described, each ring assembly is adapted to be driven from a main drive shaft 11 through the intermediary of one of the magnetic clutches E1 to E4. At M is shown a unidirectional motor which is adapted, through suitable reduction gearing represented by block 12, to drive the main shaft. A selector switch 13 having a plurality of wafers SW1 to SW5 is adapted to be actuated from the main drive shaft through a magnetic clutch ES. To four of the five switch wafers there are connected conductors which lead to banks of normally closed switches, each such bank being associated with one of the detent ring assemblies. At RS there is shown a 4-position remote selector switch electrically connected to the fifth wafer of switch 13 and which is adapted to initiate operation of the system in response to the manual setting of its movable arm to a new frequency position.

In brief, the system operates as follows: With the setting of the remote selector switch RS to a position other than the one shown, as for example to the position corresponding to channel A, a circuit is completed through motor M and magnetic clutch ES to cause switch 13 to be stepped to a position corresponding to channel A. At this new switch position parallel branch circuits are closed through one pair of normally-closed switches of each bank (S1A to S4A) to energize respectively the magnetic clutches E1 to E4, and other parallel branch circuits are closed through another pair of normally-closed switches of each bank (S'1A to S'4A) to maintain the motor in its energized state.

With the drive shaft operating, and the magnetic clutches E1 to E4 energized, the several detent ring assemblies will be rotated until the detent rings 1A, 2A, 3A and 4A which correspond to the new frequency are so positioned as to allow their associated detent arms to drop each into its respective peripheral ring notch. When this occurs the two pairs of switches above mentioned (S1A and S'1A, or S2A and S'2A, etc.) are opened, making the particular branch circuits containing them ineffective. As each pair of branch circuits is opened, the corresponding detent ring assembly is stopped at its pre-set frequency position. As a rule the several ring assemblies will not arrive at their pre-set positions at the same time since said positions are determined by the angular disposition of the peripheral ring notches which would necessarily be different for the tuning elements 1 to 4. The motor, however, will continue to operate until the very last ring assembly has been actuated to its pre-set position, it being observed that the ring assemblies control motor-stop switches that are included in branch circuits connected in parallel across the motor.

The mechanical construction of the selector mechanism is shown in Figs. 2 to 6. In Figs. 2 and 3 are shown the two detent ring assemblies for effecting tuning of the receiver and the transmitter units of the equipment. Except for the different dial calibrations and for the provision of means (to be explained later) employed in conjunction with the ring assembly for receiver tuning to permit of manual adjustment, the several assemblies are identical so that a description of any one will suffice.

As shown more clearly in Fig. 3 the detent rings of the assembly are designated A, B, C and D to correspond with the frequency channels which they are adapted to select. Each detent ring is provided at one point in its periphery with a suitably shaped notch 15 (Figs. 2, 4A and 4B) the angular setting of which determines the position of adjustment to which the associated variable element is to be actuated automatically. The detent rings are individually adjustable to enable the initial setting up of the various operating channels, or when it is desired to effect a change to another operating frequency. The manner of making such adjustment will be clear from Fig. 3. 15 and 16 are a pair of drums rigidly mounted for rotation on a sleeve (not shown) which is rigidly coupled to a shaft 17. A shoulder 18 is formed on opposite sides of each drum and the detent ring is snugly fitted thereon. A locking ring 19 is positioned on each side of the drum and by means of a pair of diametrically opposed locking screws 20 each detent ring is adapted to be clamped in position. In Fig. 3 there is shown only one of the locking screws for each ring and the manner in which it is connected to its respective locking ring. In Fig. 2 each pair of locking screws is identified on the dial plate 21 by the same channel designation as A, A; B, B, etc.

The shaft 17 extends through a bushing 17' screwed into a mounting plate 22, and coupled to the protruding end of the shaft by suitable coupling means 10 is the rotary element of one of the adjustable devices 1, 2, 3 or 4, which in Fig. 3 is shown as that of the transmitter tuning condenser 2. Mounted for movement with the ring assembly is a scissor or split gear 23 which is in meshing relation with a gear 24 mounted on a manual control shaft 25. Meshing with the latter gear is a pinion 26 carried on a shaft 27 which extends through the supporting plate, the other end of the shaft 27 having affixed thereto a crown gear 28 which is adapted to be driven from the operating motor, as will be described more fully hereinafter.

Pivotally mounted on a shaft 29 in a U-shaped bracket 30 carried by the mounting plate 22 and positioned underneath the ring assembly are four detent levers LA–LD, one for each of the detent rings. The configuration of the detent levers is shown more clearly in Figs. 4A and 4B, being provided each with a detent point 15', an aperture 31 through which the manual control shaft 25 is adapted to pass, and a laterally extending arm 32 which is utilized only in the ring assembly for receiver tuning, to be explained later. By means of a coil spring 33 connected between the lever at point 34 and a cross bar 35 supported between the side arms of bracket 30 each of the levers is urged towards its ring so that normally the detent point rides on the ring periphery as shown in Fig. 2 for the transmitter tuning ring assembly. In Fig. 4A the detent ring is shown rotated to the position where the detent point 15' has dropped into the peripheral notch 15. In order to insure the coaction of the detent point on the ring periphery a pair of guides or retaining plates 36 is affixed to the upper part of each lever, one on each side of the detent point, the plates extending sufficiently to contact the sides of the ring.

Each detent lever is adapted to cooperate with a pair of spring switches, being identified in Fig. 3 (which is a side view of the transmitter tuning ring assembly) as S2A and S'2A for ring A, S2C and S'2C for ring C, etc. Each detent ring assembly therefore has associated with it a bank of eight such spring switches, two for each of the four detent levers. Normally, that is, during the tuning operation when the detent points are riding on the rings, the switches are closed as shown in Fig. 2, due to the pressure exerted on the uppermost spring leaf by an insulating stud 37 affixed to the lower part of the detent lever. As shown in Fig. 4A when the detent is seated within its notch the switches are opened. The electrical connections to the several spring switches are shown in the wiring diagram of Fig. 7, and in describing the electrical system and its operation the upper one of each pair of switches (S2A, S2B, etc.) will be referred to as a clutch-release switch and the lower one (S'2A, S'2B, etc.) as a motor-stop switch, being the respective functions which they perform.

In order to permit of manual adjustment of the receiver tuning element to frequencies other than the four preset frequencies, there is provided a detent release shaft 38 which extends between the side arms of the U-shaped bracket 30 in parallel relation with the detent lever shaft 29. The portion of the release shaft 38 extending between the bracket arms is triangular in shape, a control knob 39 being carried on the forward end of the shaft which extends through the front panel (not shown) of the housing enclosing each pair of ring assemblies. By means of a pair of suitable stop means (not shown) the shaft is capable of movement through 60 degrees to assume at its two limiting positions the positions shown in Figs. 4A and 4B. In the former the laterally extending arm 32 is disposed with sufficient clearance above one of the sides 40 of the triangular portion of the shaft, assuming that the detent point engages the notch as shown. It will be apparent however, that in this position of the shaft 38 the requisite rocking movement of the detent lever about its shaft is allowed to take place during the automatic tuning operation. In Fig. 4B the shaft 38 is shown rotated through 60 degrees to its other limiting position, and since the axially extending ridge 41, constituting an apex of the triangle, is at a higher level in Fig. 4B than the side 40 in Fig. 4A, the detent lever is rocked about its shaft in a clockwise direction and is retained in the position shown out of contact with the detent ring. In this locked-out condition of the detent levers the manual control shaft 25, which is provided at its outer end with a control knob (not shown), may be manipulated to effect any desired adjustment of the receiving tuning element, through the gears 24 and 23 (Fig. 3). In order to provide an indication of the setting of the detent arms, whether on or off, a reference plate 39' is provided in association with the control knob 39.

Carried by the detent release shaft 38 is a movable contact 42 of a switch SM which disconnects the electrical elements associated with the receiving tuning assembly from the system to thereby permit the manual adjustment to be made, as will be described more fully with reference to Fig. 7. The fixed contact of the switch SM is shown at 42' carried at the rear of the front arm of bracket 30 (Figs. 2 and 3).

The manner of initially setting up any of the frequency-determining detent rings will now be explained. Let it be assumed that for channel A it is desired to receive on 2.7 mc. First, the manual control knob on the end of shaft 25 is rotated until the notch on ring A receives the detent point of the corresponding detent lever. Then the two locking screws identified by A on the receiving tuning dial are loosened to thereby unclamp the ring A from its supporting drum 15. Next the manual control shaft is rotated until the marking 2.7 on the calibrated dial appears opposite the indicator pointer P which projects from the front plate of the bracket 30. Finally, the locking screws A are tightened to clamp detent ring A into the newly set position, thus completing the set-up. The same procedure will be followed in setting up the other detent rings of the same or different ring assemblies.

The arrangement of the several parts constituting the electrical control system of the mechanism is shown in Fig. 5 which is a rear view of the front end of the cabinet 43 which houses the radio equipment. A partition plate 44 divides the cabinet into an upper compartment which contains the motor M and the various adjustable tuning elements 1, 2, 3 and 4, and a lower compartment which contains the various magnetic clutches E1 to E5, the motor driven selector switch 13, and the control relay CR, all of which have been mentioned previously in connection with Fig. 1.

The motor M is of the unidirectional type and is adapted, through suitable reduction gearing such as a worm and worm wheel (not shown), to drive the main drive shaft 11 which is extended through and is journaled in the side arms of a plurality of U-shaped brackets 45 fastened to the wall 45'. Adapted to be driven from the drive shaft through an idler, (not shown), is a gear 46 provided with an eccentric pin 47 which serves to actuate a Geneva cam 48 in a step-by-step fashion in a known manner. The cam 48 is carried on a shaft 49 which carries the several switch wafers SW1 to SW5 of the selector switch 13 previously mentioned. The various magnetic clutches which are adapted to effect the mechanical coupling between the main drive shaft 11 and each of the crown gears 28 are shown at E1 to E4. E5 is the magnetic clutch for effecting the coupling between shaft 11 and the gear 46. At CR is shown the control relay the function of which will be explained in connection with Fig. 7.

A detailed view of the magnetic clutches E1 to E4, which are of identical construction, is shown in Fig. 6. Each clutch is mounted by means of its frame 50 on the side arms of the bracket 46. Disposed between the opposite sides of the frame 50 is a sleeve member 51 around which there is wound a coil winding 52 and within which there is positioned at one end a core member 53. A plunger 54 in the normal position is adapted to extend into the unoccupied space of the sleeve 51 as shown in the figure. Upon energization of the coil 52 the plunger 54 will be pulled to the left by the magnetic attraction of the core, and with it there will be moved an armature 55 which is suitably attached at an intermediate portion to the protruding end of the plunger. One end of the armature is pivotally mounted on the clutch frame by means of a pin 56 and the opposite end 57, which is bifurcated, is arranged to straddle a hub 58 formed on one side of a travelling pinion 59, the hub being provided with a circular groove 60 within which the forked portion 57 of the armature is adapted to fit.

To the opposite side of the pinion there is attached a sleeve 61 having a pair of diametrically opposed slots 62 formed therein, through which and also the drive shaft there is extended a cross pin 63. Encircling the drive shaft and extending between the side arm of the bracket 46 at the left, as viewed in Fig. 6, and a washer 64 positioned at the left end of the sleeve, is a coil spring 65. The action of the spring is such that it forces the pinion 59 out of engagement with the crown gear. However, with the plunger pulled in, upon coil 52 being energized, the pinion 59 is forced into engagement with the crown gear in opposition to the spring 65.

The electrical system of the automatic selector above described will now be explained in connection with the schematic circuit diagram of Fig. 7. The same reference characters in this figure correspond to the same parts shown in the other figures. M is the operating motor and F its field. PL is a pilot light that is connected across the motor and is located at a remote control box (not shown) for providing an indication that the tuning operation is in progress. A suitable source of low voltage, which may be 12 or 24 volts, for operating the motor, the several magnetic clutches and the control relay, is represented by the plus (+) and minus (—) terminals.

The remote selector switch RS is provided with a movable arm 66 connected to a conductor 67, leading from the minus (—) terminal and with the fixed contacts A, B, C and D, representing frequency channels or predetermined positions of adjustment for the variable tuning elements. The fixed contacts of the remote selector switch are connected individually by way of conductors to the fixed contacts 1, 3, 5 and 7 associated with the switch wafer SW5. The rotor of this wafer is electrically connected to one side of the magnetic clutch E5, the other side being connected through a conductor 68 to the plus (+) terminal of the source. Connected in parallel with the clutch E5 is the control relay CR provided with a pair of movable switch arms 69 and 70. Switch arm 69 is connected to conductor 68 and is adapted in the deenergized state of the relay, as shown, to contact an upper contact which is connected to a conductor 71 and to contact a lower, blank contact when the relay is energized. Switch arm 70 is connected to conductor 67 and is adapted in the deenergized state of the relay to contact an upper, blank contact, and in the energized state of the relay to contact a lower contact connected to a conductor 72 which leads to one side of the motor, the other side of the motor through the field winding F being connected to the + terminal of the source.

The several switch wafers SW1, SW2, SW3 and SW4 are each provided with an upper set of fixed contacts 2, 4, 6 and 8 and a lower set of fixed contacts 1, 3, 5 and 7. The switch wafers SW1 to SW4 consist each of a conducting ring 73 which is provided with a pair of diametrically opposed projections 74 and 74' and the switch wafer SW5 consists of a conducting ring 75 provided with a cut-out or insulating portion 75' at one point in its periphery. The five switch wafers are mounted on the shaft 49 as shown in Fig. 5 and the several projections 74' and the portion 75' are phased as shown to assume the same angular position with the step-by-step rotation of the switch wafers which constitute the motor driven switch 13 of Fig. 1.

The fixed contacts 1, 3, 5 and 7 associated with each of the wafers are adapted to contact successively with one of the projections 74', and the fixed contacts 2, 4, 6 and 8 are adapted to contact successively with one of the projections 74, the diametrically opposed contacts of each set being thereby electrically connected simultaneously through one of the conducting rings 73. In electrical contact with each of the rings 73 is a brush contact 76, the several brush contacts being connected individually by way of leads 77 to a conductor 78 leading to the conductor 67 which is connected to the — side of the source. Interposed in the conductor 78 between the two brush leads 77 at the right is the switch SM previously mentioned and shown in Figs. 4A and 4B and is manually settable to on or off by the control knob to permit either automatic or manual tuning of the receiver.

The several banks of spring switches, which are represented in Fig. 1 as blocks in association with their respective detent ring assemblies, are shown diagrammatically in Fig. 7 and are correspondingly numbered. The actual arrangement of the spring switches of each bank is shown in Figs. 2 and 3. In designating these switches the following code has been adopted: The letter S stands for a spring switch in the upper half of the bank; the letter S' stands for a spring switch in the lower half of the bank; the numerals 1, 2, 3 and 4 refer, as in Fig. 1, to the variable elements, namely, receiver tuning condenser, transmitter tuning condenser, antenna coupling condenser and antenna tuning variometer, respectively; and the letters A, B, C and D refer, as in Fig. 3, to the frequency channels or the predetermined positions of adjustment of each tunable element. Similarly, the magnetic relays E1 to E4 are so designated as to indicate that they effect operation of the correspondingly numbered detent ring assembly or tunable element.

The electrical connections to the various normally-closed spring switches are as follows: Each of the switches in the lower half of each of the banks has one of the contacts connected to a common lead and to the conductor 72. The other contacts are individually connected to the switch wafer contacts 1, 3, 5 and 7. Each of the spring switches in the upper half of each of the banks has one of the contacts connected to a common lead and through their respective magnetic clutches E1 to E4 to the conductor 71. The other contacts are individually connected to the switch wafer contacts 2, 4, 6 and 8.

It will be observed therefore that the primed switches, S'1A, etc., are included in paths arranged as parallel branches which are connected between the motor and the — side of the source, each being thereby effective to control the motor operation. Since the switches are normally closed and the operation of the mechanism is such as to have them opened at the proper time, they may be referred to aptly as "motor-stop switches." The other switches, however, those that are not primed, S1A, etc., are also arranged in parallel branches, with a magnetic clutch serially connected with certain of the switches arranged in sets, and the several series-parallel combinations connected across the power supply source. Since the function of the latter switches is to deenergize the clutches at the proper time, they may be referred to aptly as "clutch-release" switches.

Operation of the system is as follows: The remote selector switch RS is shown adjusted to the position for channel A (a previously desired selection) with the motor-driven selector switch 13 (SW1—SW5) having been correspondingly positioned. Let it now be assumed that it is desired to select a different channel, such as, for example, C. The selector switch RS at the remote point will now be moved to contact C. This will complete a circuit through magnetic clutch ES as follows: The − side of the source; conductor 67; switch arm 66 of RS on contact C; selector switch contact 5; conducting ring 75 of switch wafer SW5; the conductor connected thereto; magnetic clutch ES; to the + side of the source. As a result the magnetic clutch ES will be energized to couple the main drive shaft 11 to the selector switch shaft 49.

Simultaneously with the energization of magnetic clutch ES the control relay CR which is in parallel therewith will operate to move the switches 69 and 70 to their lower contacts. By this action conductor 71 is disconnected from the + terminal at the switch 69 and the conductor 72 is connected to the − terminal at the switch 70. The latter connection completes the motor circuit as follows: The − side of the source; conductor 67; closed switch 70; conductor 72; motor M; field F; to the + side of the source. This will cause the motor to operate and through the Geneva drive to step along the selector switch wafers to a position such that the cut-out 75' of wafer SW5 is opposite to contact 5. This will break the circuit of clutch ES at 75' to prevent thereby further rotation of the selector switch. Simultaneously the control relay CR is deenergized, causing thereby the return of switches 69 and 70 to their upper contacts as shown. While the return of switch 70 causes the motor circuit to be broken at this point, another circuit through the motor is instantly completed as follows: the − side of the source; conductor 78; the several parallel branches which include each a conductor 77, a brush contact 76, a conducting ring 73, a projection 74' on the fixed contact 5 (it being remembered that the several switch wafers had been stepped to the fixed contacts 5 along with wafer SW5) and a normally-closed spring switch (S'1C to S'4C); the conductor 72; motor M; field F; to the + side of the source.

Simultaneously with the commencement of the operation of the motor the several parallel circuits for the magnetic clutches E1 to E4 will be completed as follows (it being remembered that the projections 74 are now on their respective fixed contacts 6): The − side of the source; conductors 67 and 78; the several parallel branches which include each a conductor 77, a brush contact 76, a conducting ring 73, a projection 74 on the fixed contact 6 and a normally-closed spring switch (S1C to S4C) and the magnetic clutches E1 to E4; conductor 71, closed switch 69, conductor 68, to the + side of the source.

As a consequence, the several magnetic clutches operate to couple their respective detent ring assemblies to the main drive shaft and the ring assemblies will be rotated until first one and then another of the C-rings attain their respective positions whereat the corresponding detent points are urged by spring pressure to drop into the ring notches, whereupon the various C-spring contacts will be opened to break first one and then another of the magnetic clutch circuits and simultaneously therewith the corresponding parallel branch motor circuits. The several ring assemblies will therefore be brought to their pre-set positions and with them the various tuning elements connected to them.

It will be clear from the above that the several detent ring assemblies begin to rotate in unison, but due to possibly different angular positions of the notches in the detent rings for the several assemblies, they arrive at their home positions at different times. The motor, however, will continue to operate until all of the detent ring assemblies have homed by reason of the parallel-branched circuit arrangement described above.

As previously mentioned the receiver tuning condenser may be disconnected from the automatic selector mechanism to enable manual tuning of the receiver to any frequency channel within its operating band. The mechanical arrangement for accomplishing this has been shown and described in connection with Figs. 4A and 4B and includes the manual knob 39 which controls switch SM. In Fig. 7 the electrical connections for this switch are shown to be included in the lead 78 which joins the negative side of the source to the brush contact lead 77 connected to wafer SW1, the part of the selector switch that controls the operation of the detent ring assembly for the receiver tuning condenser. With the switch SM in its open position, the parallel-branched circuits for the magnetic clutch E1, as well as the parallel-branched motor circuits, are not completed to the negative side of the source so that the detent ring assembly 1A—1B is free to be rotated by the knob that is provided on the manual control shaft 25.

Although the invention has been described with particular reference to a radio receiver-transmitter it will be apparent to one skilled in the art that the invention may be applied equally as well to any apparatus in which it is desired to automatically adjust a plurality of variable devices, each to a number of predetermined settings, from a remote control point.

While I have shown a particular embodiment of my invention, it will, of course, be understood that I do not wish to be limited thereto, since various modifications may be made both in the circuit arrangement, in the instrumentalities, and in the mechanical construction employed without departing from the spirit and scope of my invention as set forth in the appended claims, and I contemplate by the appended claims to cover any such modifications as fall within the true spirit and scope of my invention.

What I claim is:

1. Shaft positioning apparatus comprising, in combination, a shaft to be actuated to a pre-set position, a position-determining ring member mounted in radially adjusted relation for movement with said shaft, means including a uni-directional motor for driving said member, a switch included in the motor circuit, a switch-control and ring member locking device associated with said member, said device adapted in one position to lock said member against further movement after the shaft has been driven to its pre-set position and in another position to close the motor circuit switch, and means for initiating operation of the motor to drive the shaft to be positioned and the position-determining member, the latter upon reaching the pre-set position causing the switch-control device to assume its first position whereat the motor circuit switch is opened to deenergize the motor.

2. Shaft positioning apparatus comprising, in combination, a shaft to be actuated to a pre-set position, a position-determining ring mounted for movement with said shaft and having a peripheral notch adjustably positioned with respect to the shaft, means including a uni-directional motor for driving said ring, a switch included in the motor circuit, a switch control and ring locking member associated with said ring, said member adapted in one position to coact with the ring notch to lock the ring against further movement after the shaft has been driven to its pre-set position and in another position to close the motor circuit switch, and means for initiating operation of the motor to drive the shaft to be positioned and the position-determining ring, the latter upon reaching the pre-set position causing the switch-control member to coact with the ring notch and to assume its first position whereat the motor circuit switch is opened to deenergize the motor.

3. Shaft positioning apparatus comprising, in combination, a shaft to be actuated to one of a plurality of pre-set positions, a plurality of position-determining rings mounted for unitary movement with said shaft, each ring corresponding to a different one of the pre-set positions and being provided with a peripheral notch, means including a uni-directional motor for driving said rings, a plurality of switch-control and ring locking members each associated with a different one of said rings, a plurality of switches each under the control of a different one of said switch-control and ring locking members included in parallel-branched motor circuits, and selector means settable to positions corresponding to the pre-set shaft positions adapted when set to any one selected position to initiate operation of the motor to drive the shaft and the position-determining rings until the ring corresponding to said selected position reaches the pre-set position, whereupon the corresponding switch-control and ring locking member coacts with the ring notch to lock the ring and shaft against further movement and to open the motor circuit switch for deenergizing the motor.

4. In a mechanism for automatically and selectively adjusting a device to one of a plurality of predetermined angular positions, rotary control means operatively connected with said device comprising at least one drum member which is provided on each of its opposite faces with a shoulder, a control ring carried on each shoulder, each control ring having a stop recess in its outer peripheral edge thereof and corresponding to one of said predetermined positions, a circular clamping plate positioned adjacent each face of the drum and of sufficient extent to contact the portion of the lateral face of the control ring adjacent the inner periphery thereof, and means individual to each clamping plate for clamping the control ring to said drum in fixed adjusted position, each control ring when unclamped being adapted to be individually angularly adjusted to provide a definite angular relation between the stop recess therein and the device to be adjusted.

5. The combination with a device adapted for angular adjustment, of mechanism for automatically and selectively positioning said device to any one of a plurality of predetermined angular positions, said mechanism comprising rotary control means operatively connected with said device, said rotary control means including a plurality of coaxially mounted control rings corresponding in number to said predetermined positions and each having a stop recess in the peripheral edge thereof, a plurality of pivoted latch members corresponding to said control rings, each having a detent engageable with a corresponding recess to stop said control rings against further rotation at a predetermined control position, a uni-directional motor for actuating the rotary control means having a plurality of parallel branch circuits corresponding in number to the control rings, a plurality of normally-closed switches which are included each in one of said branch circuits and which are associated each with one of the pivoted latch members, and means upon the selective operation thereof, as determined by the desired angular adjustment of the device, to cause the corresponding motor branch circuit to be completed thereby energizing the motor to actuate the rotary control rings until the stop recess of the corresponding control ring is interlocked with the detent of the corresponding latch member, whereupon said control ring and adjustable device are locked in position and the latch member is moved to open the switch included in the above energized motor circuit for deenergizing the motor.

6. Mechanism for automatically and selectively adjusting a device to any one of a plurality of predetermined pre-set positions, comprising a plurality of positioning members movable with the device as a unit, each corresponding to one of said pre-set positions, a first selector switch adapted to be moved selectively to positions corresponding to said pre-set positions, a motor having a drive shaft, a magnetic clutch for coupling the first selector switch to the motor drive shaft, a second selector switch at a remote point adapted upon operation to determine the setting of the first selector switch, a second magnetic clutch for coupling the positioning members to the motor drive shaft, a plurality of pivoted locking levers each adapted to cooperate with a corresponding positioning member, a pair of normally-closed switches associated with each of the pivoted locking levers, one being included in circuit with the second magnetic clutch and the other being included in circuit with the motor, the arrangement being such that upon actuation of a positioning member to its pre-set position, its corresponding locking lever is actuated to open its associated switches to de-energize the motor and the second magnetic clutch, to thereby allow the device to stop in the pre-set position to which it was actuated by the motor.

7. In combination with apparatus provided with a plurality of angularly adjustable devices each of which is required, for a particular mode of operation, to be actuated to one of a plurality of predetermined positions, of mechanism as defined in claim 6 which is duplicated for each of said devices, the several first selector switches being adapted for movement in unison, the circuits for the several magnetic clutches each of which includes a clutch-release switch being connected in parallel, and the several motor circuits each of which includes a motor-stop switch also being in parallel.

8. Mechanism for automatically and selectively adjusting a device to one of a plurality of predetermined pre-set positions from a remote control point, comprising a motor, a plurality of stop rings movable with the device and adapted to be driven by the motor, each stop ring corresponding to one of said predetermined, pre-set positions, a selector switch adapted to be selectively actuated to a position corresponding to one of said predetermined positions, a magnetic relay associated with said selector switch, a multi-position switch at a remote control point having positions corresponding with those to which the device is to be adjusted, said latter switch upon manual adjustment to a desired position being adapted to energize the motor and the magnetic relay for actuating the stop rings and causing the selector switch to be selectively positioned, a pair of circuits arranged to be completed with the selective positioning of the selector switch, one of said circuits completing a circuit through the motor and the other circuit including a magnetic clutch for coupling the stop rings to the motor drive and to have the same driven thereby to the pre-set position, a plurality of pivoted locking levers each adapted to cooperate with a corresponding stop ring, and a pair of normally-closed switches associated with each pivoted locking lever and included one in each of the above circuits, the arrangement being such that upon actuation of the stop ring which corresponds to the desired pre-set position, to said pre-set position, its corresponding locking lever is actuated to open its associated switches to thereby declutch the stop rings from the motor drive and to open the motor circuit.

9. In combination with apparatus provided with a plurality of angularly adjustable devices each of which is required, for a particular mode of operation, to be actuated to one of a plurality of predetermined positions, of mechanism as defined in claim 8 which is duplicated for each of said devices, the several selector switches being adapted for movement in unison, the circuits for the several magnetic clutches each of which includes a clutch-release switch being connected in parallel, and the several motor circuits each of which includes a motor-stop switch also being in parallel.

10. Mechanism as defined in claim 8 wherein the stop rings are each provided with a peripheral notch and the pivoted locking levers are each provided with a detent, spring means for biasing each of said levers towards its corresponding stop ring so that during the rotation of the stop ring the lever detent will ride on the ring periphery, and means co-acting with the several locking levers adapted upon operation thereof to rock the levers out of engagement with the rings and to retain them in the disengaged position whereby automatic control of the mechanism from a remote point is made ineffective.

11. Mechanism as defined in claim 8 wherein the stop rings are each provided with a peripheral notch and the pivoted locking levers are each provided with a detent, spring means for biasing each of said levers towards its corresponding stop ring so that during the rotation of the stop ring the lever detent will ride on the ring periphery, means co-acting with the several locking levers adapted upon operation thereof to rock the levers out of engagement with the rings and to retain them in the disengaged position whereby automatic control of the mechanism from a remote point is made ineffective, and manually-controlled means adapted to actuate the device to any position of adjustment while the automatic control is ineffective.

12. Mechanism as defined in claim 8 wherein the stop rings are each provided with a peripheral notch and the pivoted locking levers are each provided with a detent, spring means for biasing each of said levers towards its corresponding stop ring so that during the rotation of the stop ring the lever detent will ride on the ring periphery, means co-acting with the several locking levers adapted upon operation thereof to rock the levers out of engagement with the rings and to retain them in the disengaged position whereby automatic control of the mechanism from a remote point is made ineffective, manually-controlled means adapted to actuate the device to any position of adjustment while the automatic control is ineffective, and a switch included in a common portion of the pair of circuits which during operation of the automatic control completes the motor and clutch circuits, said lever disengaging means being constructed and arranged to open the common circuit switch when set for manual control and to close the switch when set for automatic operation.

13. Mechanism as defined in claim 8 wherein the stop rings are each provided with a peripheral notch and the pivoted locking levers are each provided with a detent and a projecting arm, spring means for individually biasing each of said levers towards its corresponding stop ring so that during the rotation of the stop ring the lever detent will ride on the ring periphery, cam means co-acting with the projecting arms of the several locking levers adapted upon manual operation thereof to rock the levers out of engagement with the rings and to retain them in the disengaged position whereby automatic control of the mechanism from a remote point is made ineffective, and manually-controlled means adapted to actuate the device to any position of adjustment while the automatic control is ineffective.

14. Mechanism for effecting automatic and substantially simultaneous adjustment of a multiplicity of devices each to any one of a plurality of predetermined positions, comprising a plurality of similar sets of position determining rings, each set being operatively connected with one of the devices to be adjusted and the rings of each set corresponding respectively to the plurality of predetermined positions, a multi-wafer selector switch adapted to be moved selectively to positions corresponding to said predetermined positions, a motor having a drive shaft, a magnetic clutch for coupling the multi-wafer selector switch to the motor drive shaft, a selector switch at a remote point adapted upon operation to determine the setting of the multi-wafer switch, a magnetic clutch for each set of position determining rings for coupling the same to the motor drive shaft, a set of pivoted locking levers associated with each set of rings, the levers of each set adapted to cooperate each with a corresponding ring of the associated set, a pair of normally-closed switches associated with each of the pivoted locking levers, certain of said switches that are associated with each set of levers being included in parallel branch circuits serially connected with the magnetic clutch that is associated with the corresponding positioning member set and the other of said switches being included in parallel branch circuits serially connected with the motor, the magnetic clutch parallel branch circuits and the motor parallel branch circuits that are associated with each set of levers terminating in individual contacts with which one of the selector switch wafers is adapted to cooperate, the arrangement being such that upon actuation of the several selector switch wafers to a predetermined position, one of the magnetic clutch branch circuits and one of the motor branch circuits of each set are completed at their terminating contacts by their associated switch wafer to cause the motor to be energized and the several ring sets to be actuated by the motor until the several ring sets arrive at their respective predetermined positions whereat the locking lever of each set corresponding to the active ring is actuated to open the pair of associated switches thereby breaking the associated branch circuits, as a result of which the corresponding ring set is uncoupled from the motor drive, the several ring sets being uncoupled from the motor drive in succession as they arrive at their respective predetermined positions, the motor continuing to be energized until all of the ring sets have been actuated to their respective predetermined positions.

15. Mechanism as defined in claim 14 wherein the multiwafer switch is moved through the intermediary of a Geneva cam in a step-by-step manner to cause the several switch wafers to make successive contact with their respective terminating contacts of the several parallel branch circuits.

16. Mechanism as defined in claim 14 wherein each of the ring sets is provided with a gear for actuating the same along with the device to be adjusted, and the motor drive shaft is provided at spaced intervals with a plurality of slidably mounted gears, there being one such gear for each ring set, spring means for biasing the slidable gears away from their respective ring set actuating gears, the magnetic clutch that is associated with each ring set adapted, upon being energized, to move the slidably mounted gear into meshing relation with the associated ring set gear.

JOSEPH M. BRIAN.